United States Patent

Pradhan et al.

[11] Patent Number: 5,871,638
[45] Date of Patent: Feb. 16, 1999

[54] DISPERSED ANION-MODIFIED PHOSPHORUS-PROMOTED IRON OXIDE CATALYSTS

[75] Inventors: Vivek R. Pradhan, Cranbury, N.J.; Alfred G. Comolli, Yardley, Pa.; Lap-Keung Lee, Cranbury, N.J.

[73] Assignee: Hydrocarbon Technologies, Inc., Lawrenceville, N.J.

[21] Appl. No.: 742,541

[22] Filed: Nov. 1, 1996

Related U.S. Application Data

[63] Continuation-in-part of Ser. No. 609,759, Feb. 23, 1996.
[51] Int. Cl.$^6$ ............ C10G 1/06; B01F 27/185; B01F 27/053; B01F 23/745
[52] U.S. Cl. ............ 208/422; 502/213; 502/222; 502/325; 502/338
[58] Field of Search ...................... 502/338, 325, 502/336, 217, 213, 221, 222; 208/13, 419, 422

[56] References Cited

U.S. PATENT DOCUMENTS 3,972,829  8/1976  Michalko .................. 252/430
4,895,821  1/1990  Kainer et al .............. 502/204

Primary Examiner—Michael Lewis
Assistant Examiner—Alexander G. Ghyka
Attorney, Agent, or Firm—Fred A. Wilson

[57] ABSTRACT

A dispersed fine-sized anion-modified and phosphorus-promoted iron-oxide slurry catalyst having high surface area exceeding 100 m$^2$/gm and high catalytic activity, and which is useful for hydrogenation and hydroconversion reactions for carbonaceous feed materials is disclosed. The catalyst is synthesized by rapid aqueous precipitation from saturated salt solutions such as ferric sulfate and ferric alum, and is promoted with phosphorus. The iron-based catalysts are modified during their preparation with anionic sulfate ($SO_4^{2-}$). The resulting catalyst has primary particle size smaller than about 50 Angstrom units, and may be used in a preferred wet cake or gel form which can be easily mixed with a carbonaceous feed material such as coal, heavy petroleum fractions, mixed waste plastics, or mixtures thereof. Alternatively, the catalyst can be dried and/or calcined so as to be in a fine dry particulate form suitable for adding to the feed material. The invention includes methods for making the catalyst and processes for using the catalyst for hydroprocessing of carbonaceous feed materials to produce desirable low-boiling hydrocarbon liquid products.

22 Claims, 4 Drawing Sheets

DISPERSED ANION-MODIFIED PHOSPHORUS-PROMOTED IRON OXIDE CATALYSTS

This is a continuation-in-part of application Ser. No. 08/609,759, filed Feb. 23, 1996.

BACKGROUND OF INVENTION

This invention pertains to highly dispersed sulfate anion-modified iron oxide slurry catalysts, having high surface area and high catalytic activity for hydrocarbon hydroconversion reactions. It pertains particularly to such dispersed iron oxide catalysts which are synthesized by rapid precipitation from saturated aqueous solutions of iron salts in presence of sulfate ($SO_4^{2-}$), anions, and promoted by addition of small amounts of phosphorus as a promoter for hydrocracking/hydrogenolysis reactions. Such dispersed catalysts are useful for hydroconversion of carbonaceous feed materials such as coal, heavy petroleum resids, and other high molecular weight hydrocarbons such as waste plastics to produce desirable, low-boiling value-added hydrocarbon liquid products.

The use of various iron containing compounds such as pyrites ($FeS_2$) and red mud ($Fe_2O_3$) as catalysts for coal hydrogenation and liquefaction processes has been well known for many years. Such particulate iron catalyst compounds were usually added in small amounts to a coal-oil slurry feedstream upstream of a reactor operated at elevated temperature and pressure conditions. However, because of the generally low effectiveness of such known catalytic compounds primarily due to their low initial surface areas and inability to provide high levels of dispersion (number of catalyst particles per unit reacting volume) under reaction conditions, catalytic hydroconversion processes for coal and heavy petroleum resid feedstocks which have been developed during the past 30 years have often utilized particulate supported type catalysts. Such supported catalysts may be beads or extrudates containing small amounts of one or more active promotor metals such as cobalt, molybdenum or nickel deposited on an inert support material such as alumina or silica. Some examples of such particulate supported type catalysts are disclosed by U.S. Pat. Nos. 3,630,888 to Alpert et al, U.S. Pat. No. 4,294,685 to Kim et al; and U.S. Pat. No. 4,424,109 to Huibers et al. Such supported catalysts are used in either downflow fixed bed reactors or in upflow ebullated bed reactors maintained at desired reaction conditions of temperature, pressure and space velocity.

Although such particulate supported type catalysts such as cobalt-molybdenum or nickel-molybdenum deposited on alumina or silica support and catalytic hydroconversion processes using the supported catalysts have provided good results for hydrogenation and hydroconversion of coal and heavy oil feed materials, some disadvantages of such particulate supported type catalysts are their relatively poor contact with the feed materials and their rapid deactivation caused by deposition on the catalyst of coke and metal contaminants such as iron, titanium, nickel and vanadium contained in the feeds. Also, U.S. Pat. No. 4,136,013 to Moll et al discloses an emulsion type metal catalyst useful for hydrogenation processes, but it also has disadvantages of low catalytic activity and high catalyst usage. At the levels of catalyst usage disclosed in the Moll et al. patent, the catalyst cost becomes prohibitive unless the catalyst is recovered from the unconverted feed material and reused. U.S. Pat. Nos. 4,077,867 and 4,134,825 to Bearden et al. disclose an in-situ formed metal-carbon containing dispersed slurry catalyst, called 'M-Coke' for hydroconversion of coal, heavy oil, and mixtures thereof. The catalysts of Bearden et al. are primarily based on molybdenum which is significantly more expensive than iron. Also, disposal of used molybdenum catalysts is not environmentally as benign as that of used iron catalyst. U.S. Pat. No. 4,486,293 to D. Garg disclosed a co-catalyst combination of iron and Group VI or VIII non-ferrous metal for liquefaction of coal in hydrogen-donor solvent using water soluble salts of the co-catalyst metals. It is known that catalysts formed from the water-soluble precursor salts often undergo sintering under coal liquefaction conditions and lack the high degree of dispersion necessary for high catalytic activity. U.S. Pat. No. 5,168,088 to Utz et al. discloses a unique way of improving the slurry catalyst dispersed during coal liquefaction by precipitating the iron oxide onto the coal matrix. But it is believed that deposition by such precipitation of the entire coal feed with catalyst would be very expensive for a commercial scale of operations. V. Pradhan et al. disclosed in "Catalysis in Direct Coal Liquefaction by Sulfated Metal Oxides" Energy and Fuels, 1991, Vol. 5, various dispersed catalysts which have been found useful in coal liquefaction processes, including sulfated transition metal oxides such as sulfated iron oxides ($Fe_2O_3/SO_4$) and sulfated tin oxides ($Sn_3O_2/S_4O_4$), in which the role of added anion $_4(SO_4^{2-})$ was attributed to the prevention of catalyst sintering or agglomeration under coal liquefaction conditions. However, further improvements are needed in catalyst forms and compositions for hydroprocessing of various carbonaceous feedstocks, particularly for dispersed iron-oxide based catalysts that are less expensive, environmentally benign, and highly active for the catalytic hydroconversion processes in which they are used.

SUMMARY OF INVENTION

This invention provides fine-sized iron oxide-based highly dispersed slurry catalysts which are sulfate anion-modified and promoted with small amounts of phosphorus, and have high surface area and high catalytic activity for improved hydrogenation and hydrocracking of carbonaceous feedstocks. The catalysts are formed of hydroxides or oxyhydroxides of iron, and are synthesized by rapid aqueous precipitation from saturated salt solutions in the presence of sulfate ($SO_4^{2-}$) anion and are also promoted by addition of small concentration of phosphorus (P) to produce the fine-sized particles which after drying have high surface area in the range of 100–250 $m^2$/g. The aqueous precipitation of the primary iron oxide from saturated solutions is conducted rapidly in the presence of the sulfate ($SO_4^{2-}$) anion in the solution to produce fine-sized precipitates having high surface area. The catalyst precipitates may be preferably provided and used in a gel or a wet-cake form without removing any of the 50–80 wt. % water initially retained in it from the precipitation. However, if a dry powdered form of the catalyst is desired, the catalyst precipitates can be filtered, dried at 100–120° C., and/or calcined at temperature of 450–550° C., and usually have primary particle size smaller than about 50 Angstrom units and secondary particle size of 1–20 microns. For the preferred gel or wet-cake catalyst form containing a major portion of water, the broad useful concentration of iron in the final catalyst is 5–20 wt. %, the broad range concentrations of the sulfate anion in the final catalyst is in the range of 0.5–10 wt. %, and the concentration of phosphorus promotor is in a broad useful range of 0.05–2 wt. %. The resulting fine-sized catalysts, after drying, preferably have high surface area of 140–200 $m^2$/g.

The fine-sized dispersed anion-modified and phosphorus-promoted catalyst compositions according to this invention are useful in various slurry phase hydroprocessing reactions, such as for hydroconversion of carbonaceous feed materials including coal, heavy petroleum resids, lignin and waste plastic materials to produce desirable low-boiling value-added hydrocarbon distillate liquid products. Due to the high activity of these dispersed iron-based anion-modified and phosphorus-promoted catalysts, they can be used in small concentrations 0.05–0.2 wt. % iron relative to weight of feed for the various hydrogenation and hydroconversion reactions mentioned above, and are preferably recycled with the unconverted or partially converted high boiling fraction (454° C.+) back to the reactor for further reactions. Because these dispersed fine-sized iron based catalysts are produced from the available relatively inexpensive materials and the principal component is environmentally benign iron, they are usually disposable for large scale hydrogenation processes and do not require recovery and regeneration.

This invention advantageously provides dispersed fine-sized iron oxide-based anion-modified and phosphorus-promoted catalysts having high surface area and high catalytic activity. The catalysts are easily produced, inexpensive and are useful as an expendable slurry catalyst in processes for catalytic hydrogenation and hydroconversion of carbonaceous materials such as coal, heavy petroleum resids, and waste plastics, to produce desirable low boiling hydrocarbon liquid and gaseous products. The invention also includes methods for making the catalysts and hydroconversion processes utilizing the iron-based dispersed catalysts to produce the desired low-boiling hydrocarbon liquid products.

DESCRIPTION OF INVENTION

The dispersed anion-modified catalysts compositions according to this invention include hydroxides and oxyhydroxides of iron, combined with the sulfate ($SO_4^{2-}$) anion, and are promoted by the addition of small amounts of phosphorus (P) as an active hydrogenation metal in the form of fine-sized precipitates. The catalyst broad range compositions include 10–20 wt. % iron, 0.5–5 wt. % sulfate anion, and 0.05–2 wt. % phosphorus promotor metal, with the remainder being at least about 60 wt. % water. The catalyst can preferably be used as a wet cake consisting of a gel of precipitate particles in water containing 60–95 wt. % water, or can be produced as a dry powder obtained after drying and/or calcination of the oxyhydroxide precipitates. In the preferred gel form and mode of usage, the precipitates from hydrolysis are not filtered or dried but are used as produced. The catalyst gel form reduces the catalyst cost significantly and also does not compromise at all on its activity for relevant hydroprocessing reactions. The catalyst precipitates, after drying, have secondary particle size of 1–20 microns and surface area of 100–250 $m^2/g$. Preferred catalyst gel compositions contain 8–16 wt % iron, 1–5 wt % sulfate anion, and 0.5–1.5 wt % phosphorus with the remainder being water. The metals loading broad range for catalytic applications is 500–2000 wppm iron and 25–200 wppm phosphorus relative to the carbonaceous feed material. Preferred metal loadings in hydroconversion reactions are 800–1200 wppm iron and 50–150 wppm phosphorus relative to feed.

The dispersed iron oxide slurry catalysts of this invention are cost-effective and environmentally benign because the principal component is iron. These catalysts have been shown to be very effective for hydroconversion of high molecular weight hydrocarbons including fossil fuels such as coals and heavy petroleum residua, and organic waste materials such as co-mingled plastics from municipal solid wastes, and mixtures thereof. The catalysts of this invention, either in the preferred wet cake gel form or in the dried powder form, have been successfully tested both at 20 cc microautoclave reactor scale and at a 30 kg/day continuous two-stage pilot plant operation, under hydrogen pressures of 5–20 MPa and operating temperatures of between 400° to 460° C. The dispersed iron oxide catalysts have been utilized in small loadings relative to feed (0.05 to 0.2 wt. % iron) so that they can be used on a once-through basis in commercial hydroconversion operations. Using the dispersed slurry catalysts of this invention alone, and also in combination with other catalyst precursors, excellent process performances have been obtained in terms of carbonaceous feed conversion to liquid and gaseous products, light distillate yields, and hydrogen consumption during hydroprocessing of the different types of feed materials including coal, petroleum resid, municipal waste plastics, and lignin.

The catalyst in the gel form provides the advantage that when added to high temperature systems, the water in the gel vaporizes rapidly, helping the catalyst particles to disperse and agglomerates to break up for a more effective particle-reactant interaction. The phosphorus-promoted iron gel catalyst of this invention is very useful for hydroconversion of carbonaceous materials at broad operating conditions of reactor temperatures in the range of 400–460° C., hydrogen partial pressures between 5–20 MPa, and feed space velocities between 320–1280 $kg/h/m^3$ reactor volume. Useful loadings of the dispersed catalysts relative to feed are such that about 500–2000 wppm of iron and about 25–200 wppm of phosphorus are provided by weight relative to the feed. Under these conditions and using a two-stage back-mixed reactor configuration, carbonaceous feed conversions of 93–96 wt. % have been obtained with yields of 60–73 wt. % of light distillate liquids. The dispersed slurry catalysts of the present invention have been succesfully tested at the 30 kg/day continuous pilot plant operation for hydroconversion of coals, especially of low rank coal, heavy petroleum residua, waste plastics, and mixtures thereof. Typically, for the two-stage reactor configuration, with or without an interstage phase separation step, feed conversions of over 95 wt. % have been obtained with yields of over 75 wt. % of light distillable liquid products.

The dispersed iron-based slurry catalysts of this invention are highly versatile for use in hydroprocessing of high molecular weight carbonaceous materials besides coal such as heavy petroleum resid, mixed plastics from municipal solid wastes, biomass, and lignin. The key to the higher activity of the catalysts of this invention as compared with some other iron-based catalysts disclosed in the literature is their initial fine size and high surface area, a high extent of catalytic dispersion, and their ability to preserve the state of high dispersion under reaction conditions due to presence of anionic modifiers which are known to prevent sintering or agglomeration of fine-sized particles at high temperatures.

CATALYST PREPARATION METHODS

The dispersed fine-sized iron oxide catalyst according to this invention can be prepared using either of two methods. The preferred Method A preparation of the catalyst uses 100 g of ferric sulfate pentahydrate $Fe_2(SO_4)_3 \cdot 5H_2O$ as a starting material, to which 9–17 g of 80 wt % phosphoric acid, $H_3PO_4$, is added and dissolved in 150 cc water. Then 60–70 cc of 20–28 wt. % ammonium hydroxide ($NH_4OH$) is added at the rate of 10–20 cc/min to produce rapid precipitation until a dark brown gel is formed at a pH of 4.5, which contains 30 wt. % solids which are mostly $Fe(OH)_3$ and FeOOH with sulfate anion modifier, precipitated phosphorus and unhydrolyzed iron salts. The gel as formed can be used in the hydroconversion reactions without further drying or purification. The gel or wet cake resulting from Method A preparation contains about 10 wt. % iron, 2.0 wt. % sulfate anion and about 1.0 wt. % phosphorus promoter metal and water.

The preferred Method A catalyst can be utilized in hydroconversion processes in the form of either a wet moisture-containing cake obtained from the rapid precipitation of particles before the precipitate particles are filtered and dried, or as a dried fine-sized moisture-free powder. For the final catalyst made in the wet-cake or gel form, the hydrolysis reaction brought about by the addition of 20–28 wt. % ammonium hydroxide to the iron salt is stopped at a pH of about 4.0–5.0. This Method A gel catalyst can be advantageously used in either of the wet cake (gel) or dry powder forms for hydroliquefaction of bituminous and sub-bituminous coal to produce desired hydrocarbon liquid products, and has been shown to have similar positive results of the catalytic activity on process performance regardless of which form of the catalyst is used. Thus the use of 20–50 wt. % solids-containing catalyst filter cake becomes even more economical than the dried particulate catalyst for various hydroconversion reactions, as the dispersed catalysts of this type are set at low concentration or loading relative to the coal feed, and any moisture contained in the catalyst is not detrimental to the reaction process. In the dried form, the Method A slurry catalyst contains at least about 8–30 wt. % iron and preferably about 12–25 wt. % iron. When the Method A catalyst is promoted with small amounts of phosphorus, metal concentration will be about 0.05–2 wt. % P, the sulfate ($SO_4$) anion content is 2–6 wt. %. The BET surface area is between 140–200 $m^2/g$. For Method B catalyst preparation, ferric ammonium sulfate, (also known as iron (III) alum), $Fe_2(SO_4)_3 \cdot (NH_4)_2SO_4 \cdot 24H_2O$, is used as the starting material. The catalyst is prepared by starting with 100 g of iron (III) alum dissolved in 100–150 cc water, and adding 20–28 wt. % ammonium hydroxide solution at 10–20 cc/min rate so as to produce precipitate particles (by hydrolysis of the starting iron salt) of $Fe(OH)_3$ at final pH of 7.5–8.5. The precipitate particles are washed, filtered, and dried at about 100–120° C. for 20–24 hours. The resulting dried iron oxide sulfate catalyst can also be calcined further at about 450–550° C. for 2–4 hours if desired to increase hydrocracking activity of the catalyst at the expense of hydrogenation activity. Phosphoric acid ($H_3PO_4$) as a source of phosphorus promoter, is added to dried catalyst to produce $Fe(OH)_3/SO_4/P$ catalyst after drying.

Whenever the dispersed iron-based catalyst is used in the gel or wet-cake form, the catalysts prepared by either Method A or Method B needs to be premixed with a slurrying oil (recycle solvent in coal liquefaction processes) with agitation at temperatures lower than the boiling point of water. In the dried powdered form the catalysts can be simply added to the feed mixing tank and provided with some suitable means of agitation. It is also essential that enough sulfur is present in the reaction system for the in situ sulfidation of the dispersed catalyst; the sulfur can be provided either via feeds or it can be added to the reaction system in the form of a sulfur compound.

BRIEF DESCRIPTION OF DRAWINGS

The process for utilizing the dispersed catalyst of this invention will be described with reference to the following drawings, in which.

PROCESSES UTILIZING DISPERSED IRON OXIDE CATALYSTS

The dispersed fine-sized iron oxide catalysts of this invention can be advantageously used in processes for catalytic hydroconversion of various high molecular weight carbonaceous feed materials, including coal, petroleum residua, plastic wastes, and mixtures thereof to produce the desired lower-boiling hydrocarbon liquid products, which include transportation and utility fuels such as gasoline, diesel, kerosine, fuel oil, and petrochemicals. The catalyst of this invention, in either the preferred gel form or the dried particulate form, can be added to the hydrocarbon feedstream upstream of the reactor, or it can be injected directly into the reactor along with a premixed slurrying oil at elevated temperature and pressure conditions. It is necessary that enough sulfur or hydrogen sulfide is present in the reaction system for the dispersed catalyst metals to be activated in situ by sulfidation. Usually, the amount of sulfur provided is the amount that gives about 5–10 wt. % $H_2S$ in the gas phase hydrogen.

Catalytic hydroconversion processes utilizing the catalysts of this invention can be performed in a single-stage reactor, but preferably utilize two-staged hydroconversion reactors connected in series, either in a close-coupled arrangement or with an insterstage gas/liquid separator. For such hydroconversion processes utilizing the anion-modified and phosphorus-promoted iron oxide catalyst of this invention, the carbonaceous feed material should contain sufficient sulfur content to adequately sulfide the catalyst during operations. Whenever the feedstream contains insufficient sulfur, a sulfur-containing compound should be added either to the feedstream or directly into the first stage reactor. For two-staged reactors, different reaction conditions can be maintained in each reactor as may be desirable for achieving best hydroconversion results on a particular hydrocarbon feed material. Both first and second staged reactors can contain only the dispersed type slurry catalyst, as generally shown in FIG. 1.

Figure 2:
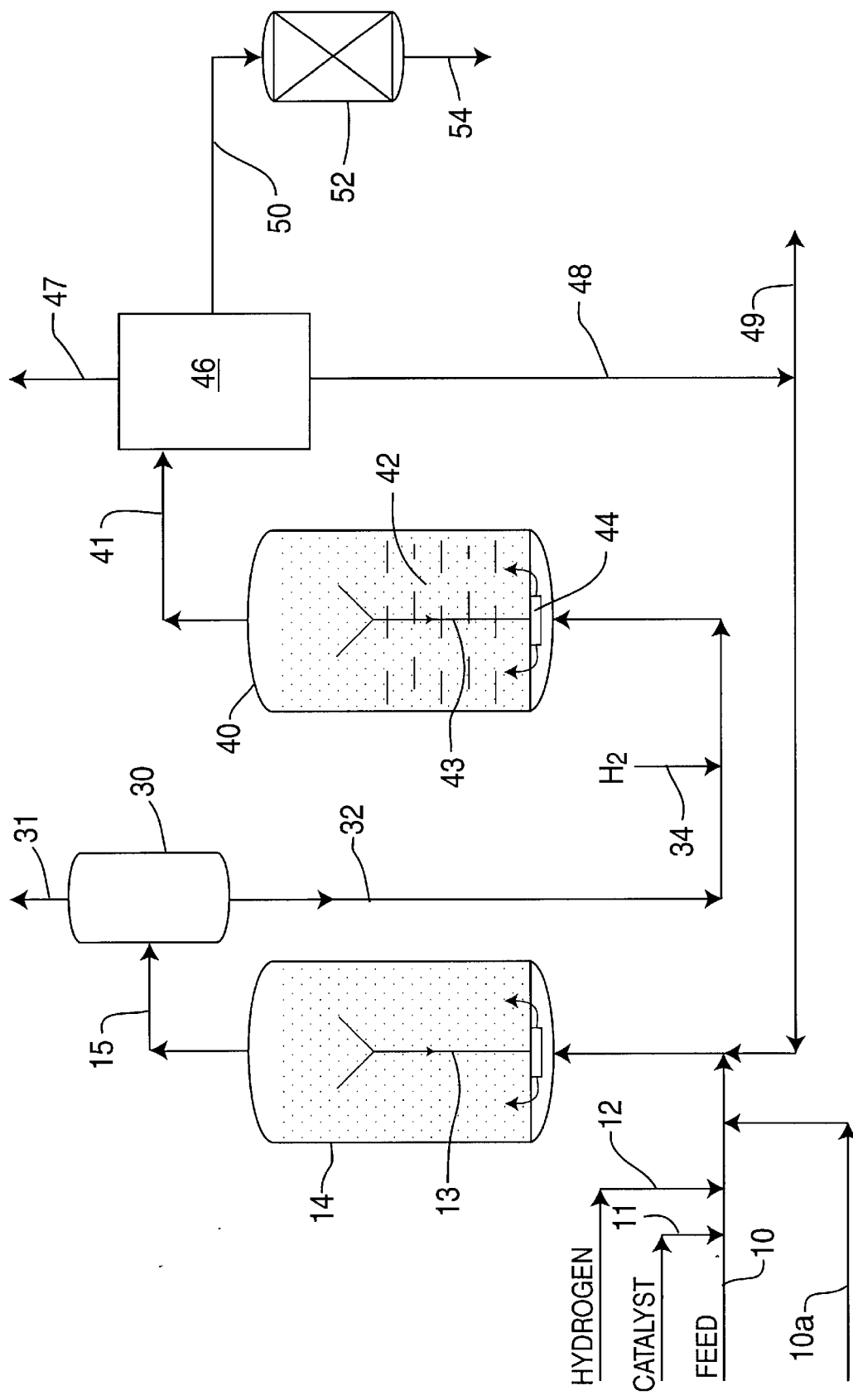
FIG. 2 is a schematic flow diagram similar to FIG. 1 but utilizes a dispersed iron-based slurry catalyst in the first stage reactor and a fluidized bed of supported particulate catalyst in the second stage reactor.

The two-staged reactors can both be operated at essentially equal temperatures within the broad range of 400–460° C., or the first stage reactor temperature can be either lower or higher than that of the second stage reactor. However, it is usually preferred for the first stage reactor temperature to be 10–30° C. lower than the second stage reactor temperature. Effluent from the first stage reactor can be phase separated to remove gases and light fractions before passing the heavier liquid fraction on to the second stage reactor for further catalytic reactions therein Alternatively, the catalyst can be utilized in a hybrid process mode in which one of the reactors, preferably the second stage reactor, will contain an ebullated catalyst bed of a particulate supported type catalyst such as cobalt-molybdenum or nickel-molybdenum on alumina support extrudates, as generally shown in FIG. 2. Both the staged hydroconversion reactors are operated in a back-mixed mode. The reactor liquid and catalyst slurry can be recycled either within the reactor or external to the reactor to maintain adequate mixing and catalyst/liquid contact therein. For the FIG. 2 arrangement, both reactors can be operated at substantially equal temperatures within the broad range of 400–460° C. However, it is usually preferred for the first stage reactor temperature to be 10–30° C. lower than the second stage reactor containing a supported type particulate catalyst.

The first stage reactor effluent stream is phase separated to form vapor and liquid fractions, and the resulting liquid fraction is distilled to produce various desired lower-boiling hydrocarbon distillate liquid products. The distillation bottom heavy liquid residue containing most of the dispersed catalyst is usually recycled back to the first stage reactor for further hydroconversion reactions therein.

Figure 1:
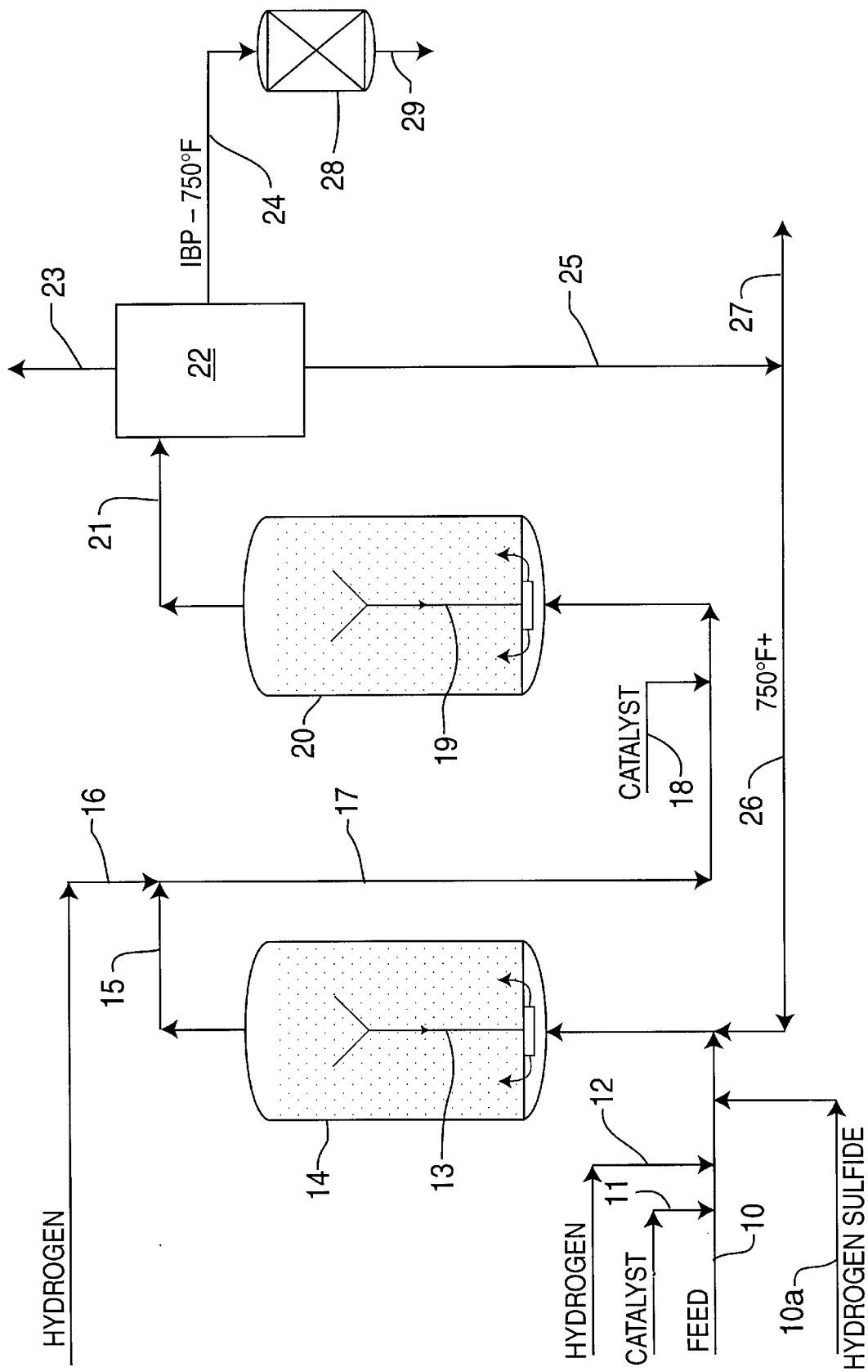
FIG. 1 is a schematic flow diagram of a close-coupled catalytic two-stage hydroconversion process utilizing dispersed iron-based slurry catalysts in both reactor stages.

As shown in FIG. 1, a carbonaceous feed material such as particulate coal provided at 10 is slurried with a suitable slurrying oil and pressurized and fed together with the dispersed iron-based catalyst provided at 11, and hydrogen at 12 upwardly into the first stage reactor 14, where the reacting material is back-mixed and circulated internally at 13 to provide a continuously stirred tank reactor (CSTR) action. The preferred reaction conditions are 410–430° C. temperature, 7–17 MPa hydrogen partial pressure, and 400–800 kg/h/m$^3$ reactor space velocity. If the carbonaceous feed material does not contain sufficient sulfur to adequately sulfide the catalyst in the reactor, a suitable sulfur-containing compound such as hydrogen sulfide can be injected at 10a into the feedstream 10.

From the first stage reactor, partially reacted effluent material at 15 has additional hydrogen added at 16 and additional catalyst added at 18, and is passed into second stage reactor 20 which is back-mixed at 19 for further reactions therein. Preferred operating conditions in the reactor 20 are 420–450° C. temperature and 7–17 MPa hydrogen partial pressure. An effluent stream is withdrawn at 21 and further processed in a series of high and low pressure gas-liquid separators and distillation steps provided in section 22. A product gas stream including light hydrocarbon gases $C_1$–$C_3$ together with $H_2$, CO, $CO_2$, $NH_3$, and $H_2S$ is withdrawn at 23, and the hydrogen fraction is purified and recycled back to the first stage reactor at 12 along with make-up $H_2$ provided at 16 as needed. Hydrocarbon liquid product having a typical boiling range of 80–750° F. is withdrawn at 24. A heavier 750° F.+ liquid or slurry stream 25 which may contain some dispersed catalyst is recycled as stream 26 back to the first stage reactor 14, and a portion of the refractory product and any unreacted solids may be removed as stream 27. If desired, the liquid product stream at 24 may be passed to an in-line catalytic fixed-bed hydrotreater 28 for improving the quality of the light distillate product which is withdrawn at 29.

An alternative catalytic two-stage hydroconversion process for carbonaceous feeds such as coal is shown in FIG. 2. This FIG. 2 process is similar to that shown in FIG. 1 in that the first stage reactor 14 utilizes the dispersed slurry catalyst of this invention. However, the first stage reactor effluent at 15 is passed to a gas-liquid high pressure interstage separator 30, from which a vapor fraction 31 is removed and a liquid/slurry fraction 32 is passed with added hydrogen at 34 to the second stage reactor 40, which contains an expanded bed 42 of a conventional supported type extrudate catalyst. For this FIG. 2 arrangement for coal feed, the temperature in first stage reactor 14 is preferably 420–450° C. and the temperature of the second stage reactor catalyst bed is preferably 410–430° C. The fine sized dispersed catalyst contained in the liquid fraction stream 32 is passed through the expanded catalyst bed 42 in the second stage reactor 40, the bed being expanded by reactor liquid recycled through down-comer conduit 43 and pump 44. The second stage reactor effluent stream 41 is passed to a product separation section 46 which is operated similarly as the separation section 22 for the FIG. 1 process. A product gas stream is withdrawn at 47, and heavy liquid/slurry stream withdrawn at 48 and which may contain some dispersed catalyst from the first stage reactor 14, is recycled to reactor 14 in a similar manner as in the FIG. 1 process.

A portion of the slurry stream 48 may be withdrawn at 49. For both the processes shown in FIGS. 1 and 2, the light liquid product stream 50, normally boiling between 80–750° F., which is the net process distillate product may be passed through an in-line fixed-bed hydrotreating reactor 52 so that the resulting distillate products at 54 have a high hydrogen content and low heteroatom (N,S,O) content.

The dispersed iron-oxide catalysts of this invention can also be advantageously used in processes for hydroconversion of petroleum residua feedstocks, and also for cracking of high molecular weight polymeric feed materials, such as waste plastics from municipal solid waste streams including polyethylene, polypropylene, and polystyrene, provided either alone in a co-mingled state, or mixed with coal and/or heavy oil. Useful reaction conditions for such petroleum residua hydroconversion reactions are 425–450° C. temperature and 7–17 MPa hydrogen partial pressure. Useful reaction conditions for hydrocracking plastic wastes are similar to those for hydrocracking of coal and heavy petroleum residua.

The dispersed iron-oxide catalysts of this invention have been successfully utilized in continuous pilot plant operations in the processes of direct coal liquefaction, coal/oil coprocessing, coal/waste plastics coprocessing, heavy oil upgrading, oil/waste plastics coprocessing, and coal/oil/waste plastics coprocessing. Using the operating conditions mentioned above, significant process performance improvements have been obtained not only for increased residuum conversion and distillate product yields, but the process is less complex operationally because a supported catalyst ebullated bed type reactor is replaced by a simpler back-mixed slurry catalyst reactor. Use of the dispersed slurry catalyst also allows better utilization of the reactor space for the reacting feed material, and as a result the overall throughput of the process can be improved by as much as 50%.

This invention will be described further with the aid of the following Examples, which should not be construed as limiting in scope.

EXAMPLE 1

To evaluate the effect of phosphorus active metal in the dispersed iron-oxide catalyst, comparison runs were made using a sub-bituminous coal feed (Wyoming Black Thunder Mine) to a 30 kg/day continuous pilot plant two-stage hydroconversion unit utilizing dispersed anion-modified iron oxide catalyst with molybdenum as the active metal, and similar iron-oxide catalyst containing phosphorus as a promoter material. The operating conditions, catalyst loading relative to the feed, and results of these runs are shown in Table 1 as follows.

TABLE 1

Comparison between dispersed iron-oxide molybdenum gel catalyst and iron-oxide phosphorus gel catalyst for liquefaction of sub-bituminous coal

|  | Dispersed Fe Oxide Catalysts w/Molybdenum | Dispersed Fe Oxide Catalysts w/Phosphorus |
|---|---|---|
| Process Conditions | | |
| Space velocity, kg/h/m$^3$ reactor | | |
| First Stage | 876 | 898 |
| Second Stage | 876 | 898 |
| Reactor Temperature, °C. | | |
| First Stage | 441 | 441 |
| Second Stage | 450 | 449 |
| Pressure, Mpa | 17 | 17 |
| Catalyst Mental Loading, ppm | | |
| Iron | 5000 | 1000 |
| Molybdenum | 50 | 50 |
| Phosphorus | 0 | 100 |
| Performance & Product Yields, wt. % maf coal | | |
| $C_1$–$C_3$ Gases | 9.0 | 9.9 |
| Naphtha ($C_4$- 117° C.) | 23.2 | 20.3 |
| Mid-distillate (177–343° C.) | 23.2 | 25.6 |
| Heavy distillate (343–524° C.) | 15.6 | 21.3 |
| Residuum(524° C.+) | 10.0 | 4.1 |
| Hydrogen Consumption | 5.8 | 6.7 |
| Coal Conversion | 92.8 | 93.4 |
| Residuum Conversion | 82.6 | 89.3 |
| $C_4$ - 343° C. distillate yield | 46.4 | 45.9 |
| $C_4$ - 524° C. distillate yield | 62.0 | 67.2 |
| Hydrogen Efficiency | 10.7 | 10.0 |
| $C_4$ - 524° C. yield (bbl per ton coal) | 3.5 | 3.8 |

From the above results, it is seen that the dispersed iron catalyst with 100 ppm added phosphorus active metal provided increase percentage coal and residuum conversions, and increased yields of $C_4$—524° C. distillate fraction as compared to the sulfate anion modified iron oxide catalyst with only molybdenum as the active metal.

Figure 3:
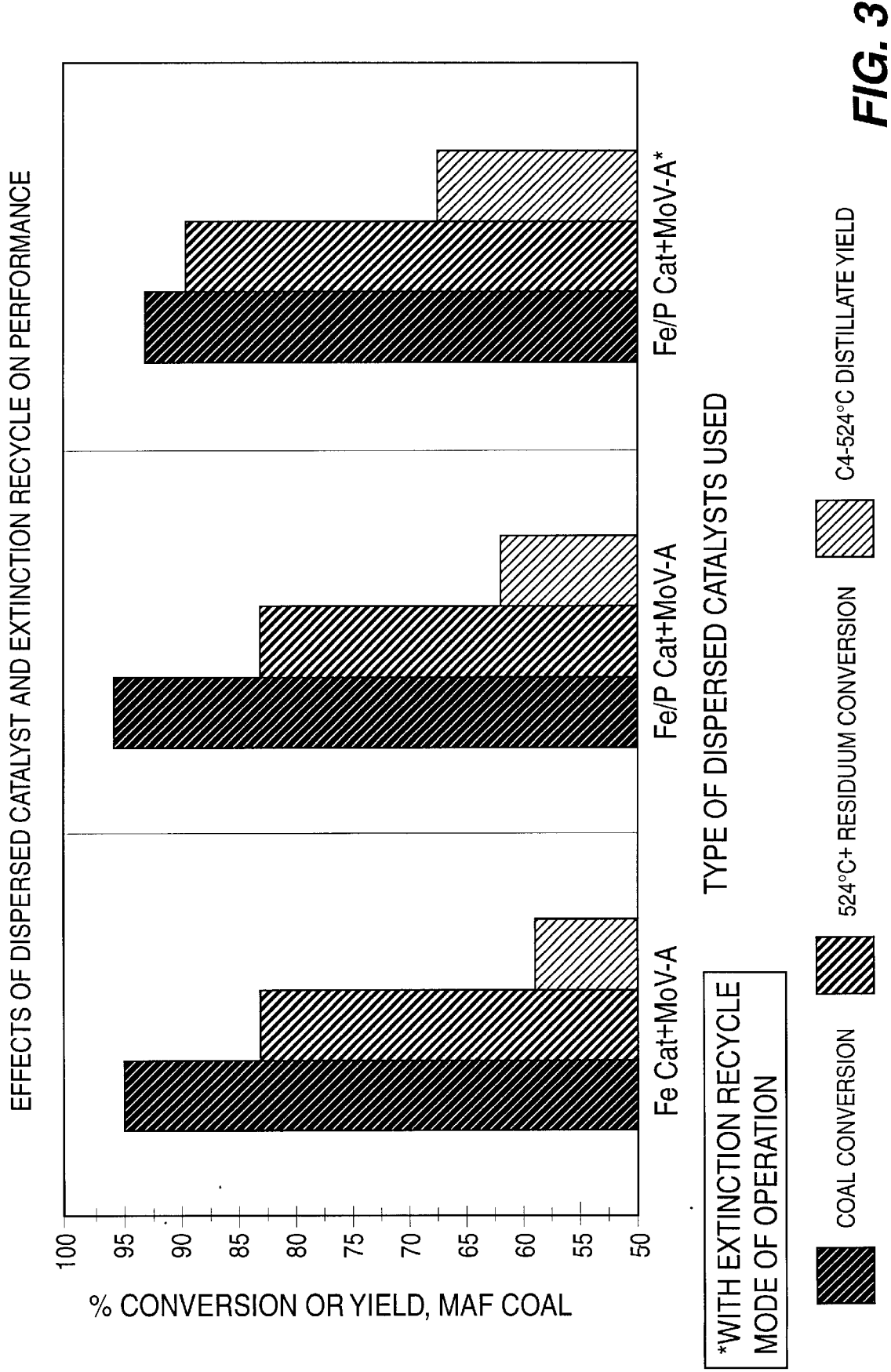
FIG. 3 is a chart showing the comparison of coal conversion, resid conversion, and distillate yields, utilizing different dispersed catalysts in pilot plant continuous operations on a subbituminous coal feed.
Figure 4:
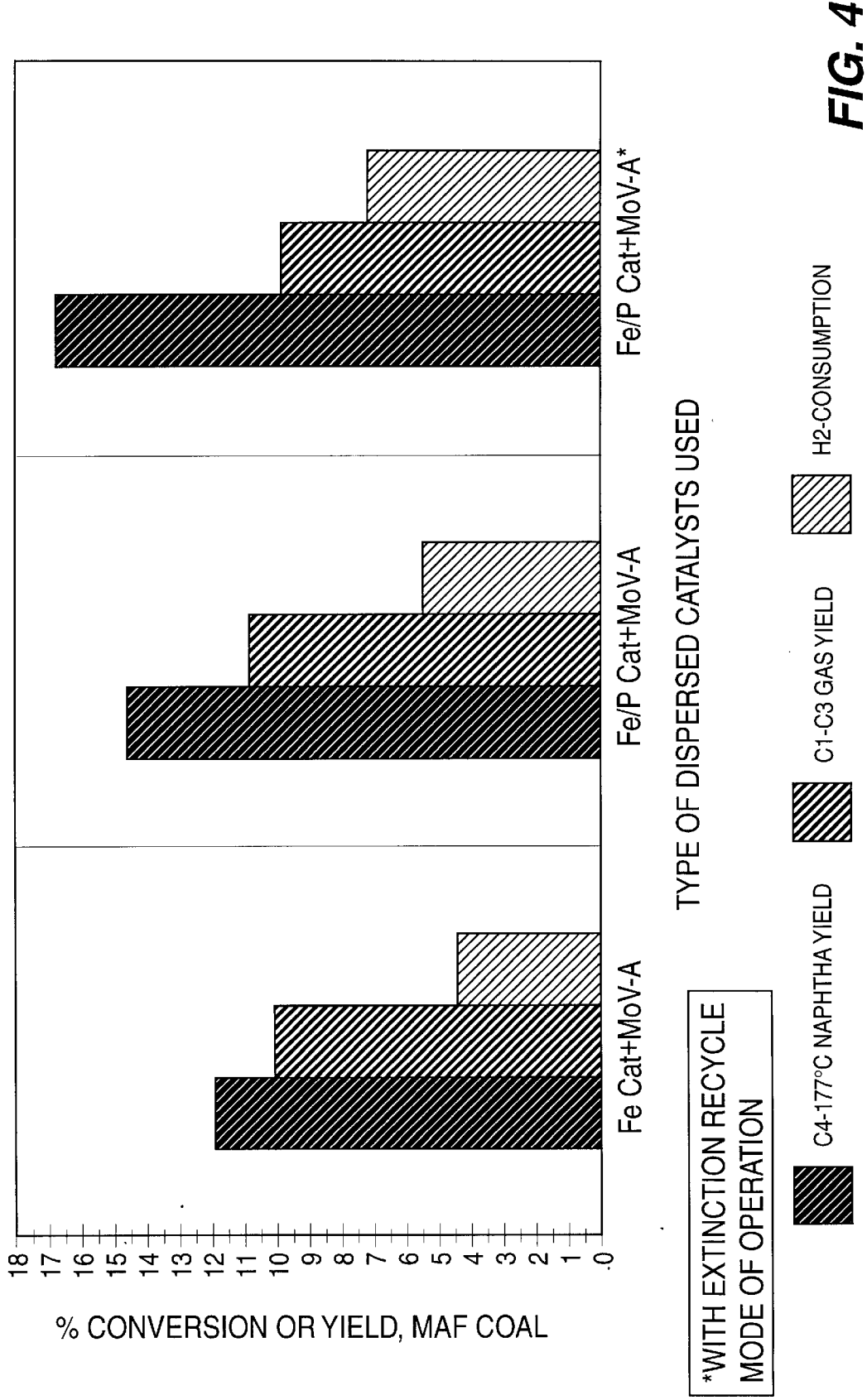
FIG. 4 is a chart showing the comparison of naphtha yield, gas yield, and hydrogen consumption, utilizing different dispersed catalysts in pilot plant continuous operations on a subbituminous coal feed.

Comparative results for the present sulfate-modified phosphorus-promoted iron oxide catalyst vs. a similar catalyst not promoted with phosphorus, are also shown in FIGS. 3 and 4. It is seen that the present phosphorus-promoted dispersed catalyst provides increased hydrogen consumption and higher distillate yields, particularly for the extinction recycle mode of operation.

EXAMPLE 2

Comparison runs were also made in the 30 kg/day continuous two-stage bench scale unit on bituminous Illinois No. 6 coal feed using the dispersed iron oxide anion-modified catalyst, containing 100 wppm phosphorus with and without molybdenum. Operating conditions, catalyst loadings relative to coal, and results are show in Table 2 below.

TABLE 2

Dispersed Catalyst Operations for Bituminous Coal Liquefaction

| PROCESS CONDITIONS | | |
|---|---|---|
| Space Velocity, fresh feed/reactor volume, lb/hr/ft$^3$ | | |
| First Stage | 38.5 | 42.2 |
| Second Stage | 38.5 | 42.2 |
| Reactor Temperatures, °C. | | |
| First Stage | 444 | 447 |
| Second Stage | 474 | 458 |
| Reactor Pressure, Mpa | 17 | 17 |
| Dispersed Catalyst Loading, ppm | | |
| Iron | 1000 | 1000 |
| Molybdenum | 0 | 50 |
| Phosphorus | 100 | 100 |
| NET NORMALIZED YIELDS, WT. % maf fresh feed | | |
| $C_1$–$C_3$ Gases | 7.2 | 6.7 |
| Naphtha | 19.2 | 18.4 |
| Middle Distillates | 32.6 | 32.27 |
| Heavy Distillates | 21.4 | 22.7 |
| 524° C. + Residuum | 10.3 | 11.0 |
| Unconverted Feed | 4.4 | 3.8 |
| PROCESS PERFORMANCE, WT. % maf fresh feed | | |
| Hydrogen Consumption | 5.52 | 5.23 |
| Total Feed Conversion (SO$_3$ Free) | 95.6 | 96.2 |
| 524° C. + Conversion | 85.3 | 85.3 |
| $C_4$-524° C. Distillates | 73.2 | 73.4 |

From the above results, it is seen that percentage conversion of bituminous coal feed to $C_4$—524° C. distillate fraction and 524° C.+ residuum fraction materials were essentially equal, thereby indicating that the added phosphorus in the catalyst is the more important ingredient than added molybdenum.

EXAMPLE 3

Several continuous co-processing runs were made in the two-stage hydrogenation unit on various feed mixtures of sub-bituminous coal, petroleum resid, auto fluff, and mixed waste plastics, using the dispersed iron oxide catalyst containing phosphorus. The operating conditions and results are shown in Table 3.

TABLE 3

Catalytic Co-Processing of Coal/Petroleum Resid Feed with Auto Fluff and/or Waste Plastics

PROCESS CONDITIONS

| Feed Composition, W % | | | | | |
|---|---|---|---|---|---|
| Black Thunder Mine Coal | 100 | 0 | 50 | 75 | 50 |
| Hondo VTB Oil | 0 | 70 | 30 | 0 | 0 |
| ASR | 0 | 30 | 20 | 25 | 25 |
| Waste Plastics | 0 | 0 | 0 | 0 | 25* |
| Space Velocity, lb fresh feed/h/ft³ reactor vol | | | | | |
| First Stage | 44.9 | 39.61 | 37.6 | 39.5 | 33.4 |
| Second Stage | 44.9 | 39.61 | 37.6 | 39.5 | 33.4 |
| Reactor Temperatures, °C. | | | | | |
| First Stage | 441 | 442 | 441 | 443 | 441 |
| Second Stage | 449 | 451 | 451 | 452 | 450 |
| Pressure, Mpa | 17 | 17 | 17 | 17 | 17 |
| Dispersed Catalyst Loading, ppm | | | | | |
| Iron | 1000 | 1000 | 1000 | 1000 | 1000 |
| Molybdenum | 50 | 50 | 50 | 50 | 50 |
| Phosphorus | 100 | 100 | 100 | 100 | 100 |

NET NORMALIZED YIELDS, WT. % maf fresh feed

| $C_1$–$C_3$ Gases | 9.9 | 7.0 | 8.6 | 6.9 | 7.8 |
|---|---|---|---|---|---|
| Naphtha | 20.3 | 21.4 | 25.5 | 14.7 | 20.7 |
| Middle Distillates | 25.7 | 23.0 | 22.8 | 16.6 | 19.5 |
| Heavy Distillates | 21.6 | 24.7 | 18.5 | 25.4 | 21.2 |
| 524° C. + Residuum | 3.7 | 16.0 | 10.5 | 18.0 | 14.0 |
| Unconverted Coal | 6.8 | 3.6 | 6.0 | 9.6 | 8.9 |

PROCESS PERFORMANCE, WT. % maf fresh feed

| Material Recovery Baland | 100.8 | 100.6 | 102.7 | 102.9 | 104.1 |
|---|---|---|---|---|---|
| Hydrogen Consumption | 6.7 | 5.9 | 6.4 | 6.1 | 3.2 |
| Coal Conversion ($SO_3$ Free) | 93.4 | 95.9 | 94.6 | 90.9 | 91.7 |
| 524° C. + Conversion | 89.3 | 80.4 | 83.9 | 73.8 | 77.8 |
| $C_4$ - 524° C. Distillates | 67.2 | 69.5 | 67.5 | 57.5 | 61.6 |
| 524 + °C. Resid Yield, maf ff | 4.1 | 15.6 | 10.7 | 17.1 | 13.8 |

*60% high density polyethylene and 40% polystyrene

Results of these runs indicate that high percentage conversions and good yields of distillate liquid products were obtained using the dispersed iron-oxide catalyst containing phosphorus active metal according to this invention, and that it is a highly effective catalyst for co-processing of low rank subbituminous coal with heavy petroleum resid and waste organics including auto fluff and mixed plastic waste.

We claim:

1. A dispersed fine-sized anion-modified and phosphorus-promoted slurry catalyst composed of hydroxides or oxyhydroxides of iron precipitates formed in presence of 0.5–10 wt. % sulfate ($SO_4^{2-}$) anions, said precipitates containing 5–20 wt. % iron and being promoted with addition of 0.05–2.0 wt. % phosphorus promoter material, with the remainder being water said catalyst having primary particle size smaller than about 50 Angstrom units and a secondary particle size of 1–20 microns.

2. The catalyst material of claim 1, wherein said precipitate particles contain 8–16 wt. % iron, 1–5 wt. % sulfate ($SO_4^{2-}$) anion, and 0.5–1.5 wt. % phosphorus, with the remainder being water.

3. The catalyst material of claim 1, wherein the precipitates are in the form of a gel containing at least about 60 wt. % water.

4. The catalyst material of claim 1, wherein the precipitates are in the form of dried fine-sized particles having surface area of 100–250 m²/g.

5. A dispersed fine-sized anion-modified and phosphorus-promoted slurry catalyst material composed of hydroxides or oxyhydroxides of iron and being in a gel form, said catalyst including precipitates formed in the presence of 1.0–5.0 wt. % sulfate ($SO_4$) anions, said precipitates containing 8–16 wt. % iron, 0.5–1.5 wt. % phosphorus, with the remainder being water, said precipitates having a primary particle size smaller than about 40 Angstrom units.

6. A method for making a fine-sized dispersed catalyst prepared by rapid aqueous precipitation from salt solutions containing iron, a source of sulfate anion, and a source of phosphorus, comprising the steps of:

(a) dissolving an iron salt containing 5–20 wt. % iron and 0.5–10 wt % sulfate anions, and a promoter metal salt containing a phosphorus salt at 20–30° C. temperature and forming an aqueous solution; and (b) adding ammonium hydroxide to said solution at a rate of 10–20 cc/min to form precipitates at a final pH of 4.0–5.0.

7. The catalyst making method of claim 6, wherein the starting material is ferric sulfate pentahydrate, $Fe_2(SO_4)_3 \cdot 5H_2O$, the source of phosphorus is phosphoric acid ($H_3PO_4$) and a sufficient amount of 20–28 wt. % ammonium hydroxide is added to provide a pH of 4.0–5.0 and produce precipitates in gel form.

8. The catalyst making method of claim 7, including adding 20–28 wt % ammonium hydroxide in a sufficient amount to produce a pH of 7.5–8.5, and filtering and drying the solution at 100–120° C. temperature to produce particles with primary size smaller than 50 Angstroms and surface area of 100–250 m²g.

9. The catalyst making method of claim 6, wherein the starting material is ferric ammonium sulfate, the promoter metal salt is 80 wt % phosphoric acid or ammonium phosphate, and 20–28 wt % ammonium hydroxide solution is added in amounts sufficient to provide a pH of 4.0–5.5 and to produce the precipitates in a gel form.

10. The catalyst making method of claim 9, including addition of 20–28 wt % ammonium hydroxide in amounts sufficient to produce a pH of between 7.5–8.5, then filtering, and drying the precipitates at 100–120° C. temperature to produce primary particulate solids smaller than 50 Angstroms and having surface area of 100–250 m²/g.

11. A catalytic process for hydroconversion of a high molecular weight carbonaceous feed material to produce lower boiling hydrocarbon liquid products, the process comprising:

(a) reacting a carbonaceous feed material with a dispersed iron-based, anion-modified catalyst as defined by claim 1 under reaction conditions of 400–460° C. (750–860° F.) temperature, 5–20 MPa (735–2950 psig) hydrogen partial pressure, 320–1280 kg/h/m³ reactor (20–80 lb/h/ft³ reactor) space velocity, and catalyst loading of 500–2000 ppm iron relative to the feed and in the presence of sufficient sulfur to sulfide the catalyst and producing an effluent containing vapor and liquid fractions; and (b) phase separating the effluent into vapor and liquid fractions, distilling the liquid fraction, and withdrawing a low-boiling hydrocarbon liquid product.

12. A catalytic hydroconversion process according to claim 11, wherein the carbonaceous feed material is coal and the reaction conditions are 425–450° C. temperature, 7–17 MPa hydrogen partial pressure, and space velocity of 400–800 kg/hm³ reactor volume.

13. A catalytic hydroconversion process according to claim 11, wherein the feed material is heavy petroleum resid.

14. A catalytic hydroconversion process according to claim 11, wherein the feed material is a mixture of coal and heavy petroleum resid.

15. A catalytic hydroconversion process according to claim 11, wherein the feed material is waste co-mingled plastics consisting of polyethylene, polystyrene, and polypropylene.

16. A catalytic hydroconversion process according to claim 11, wherein the feed material is a mixture of heavy petroleum resid, and co-mingled plastic waste.

17. A catalytic hydroconversion process according to claim 11, wherein the feed material is a mixture of coal, waste co-mingled plastics, and heavy petroleum resid.

18. A catalytic hydroconversion process according to claim 11, wherein the feed material is reacted in two-stage close-coupled catalytic reactors connected in series.

19. A catalytic hydroconversion process according to claim 11, wherein the feed material is reacted in two-stage reactors connected in series with a gas-liquid separation step located interstage between the two reactors.

20. A catalytic hydroconversion process according to claim 18, wherein the first stage reactor contains dispersed iron oxide catalyst and the second stage reactor contains an expanded bed of a supported extrudate type catalyst.

21. A catalytic hydroconversion process according to claim 18, wherein the first stage reactor temperature is 10–30° C. lower than that of the second stage reactor.

22. A catalytic hydroconversion process according to claim 20, wherein the first stage reactor temperature is 10–30° C. higher than that of the second stage reactor.

* * * * *